Dec. 26, 1922.

C. A. HARDY.
DEMOUNTABLE RIM.
FILED FEB. 12, 1920.

1,440,290

Inventor
C. A. Hardy,
By
Attorney

Patented Dec. 26, 1922.

1,440,290

UNITED STATES PATENT OFFICE.

CARL A. HARDY, OF BERLIN HEIGHTS, OHIO.

DEMOUNTABLE RIM.

Application filed February 12, 1920. Serial No. 358,069.

*To all whom it may concern:*

Be it known that CARL A. HARDY, a citizen of the United States, residing at Berlin Heights, in the county of Erie and State of Ohio, has invented new and useful Improvements in Demountable Rims, of which the following is a specification.

The object of the invention is to provide a demountable rim embodying two telescopically connected sections each one of which carries one of the clincher flanges by means of which the tire is held on the rim. To this end the improved rim comprises one continuous section and one split section, the latter being readily attachable to the continuous section and positively held in connection therewith when the rim is placed on the felly of a wheel.

A further object of the invention is to provide a device of the character mentioned, which is simple in construction, durable and effective in operation and inexpensive to manufacture.

To the exact construction in which it is shown and described, the invention is not to be restricted. The right is reserved to make such changes or alterations as the actual reduction to practice may suggest in so far as such changes or alterations are compatible in spirit with the annexed claim.

Figure 1:
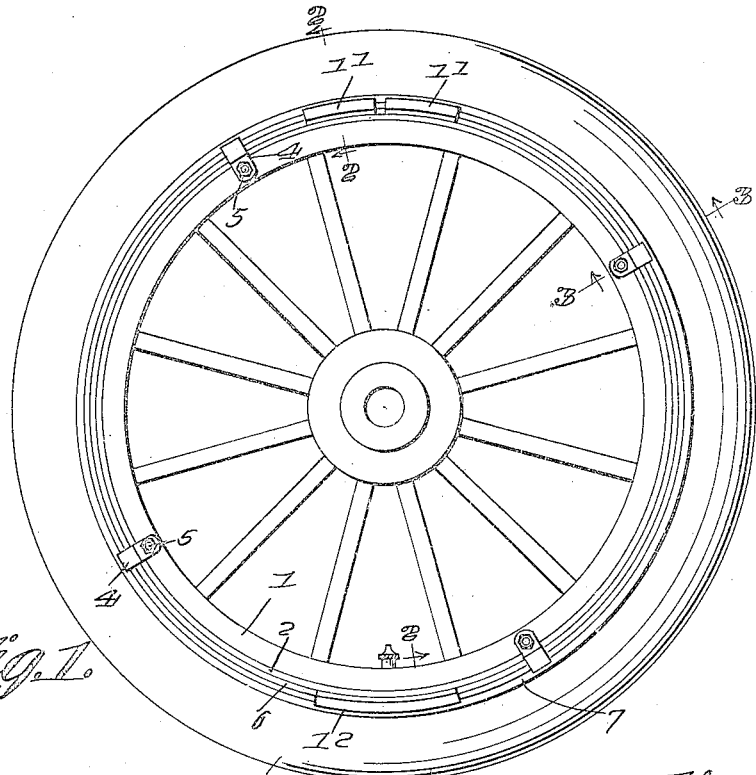
Fig. 1 is a view in side elevation of a vehicle wheel with which the improved rim is used
Figures 2, 3, 4:
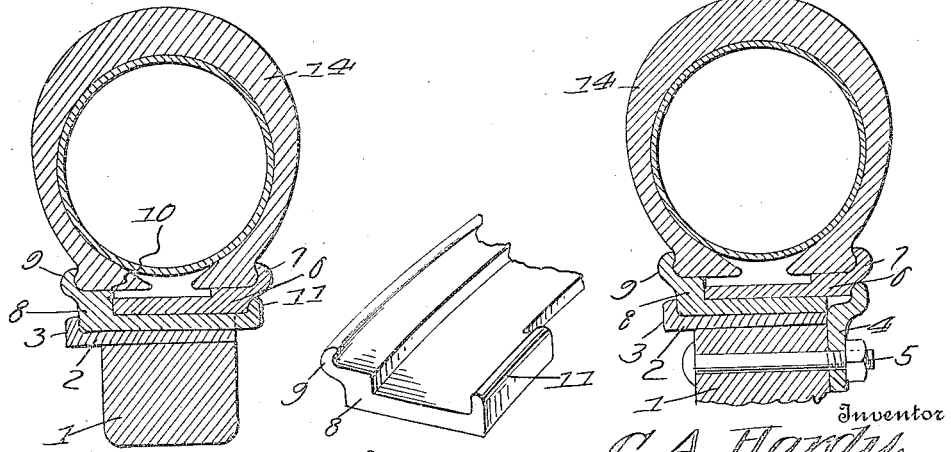
Fig. 2 is a section on the line 2—2 of Fig. 1
Fig. 3 is a section on the line 3—3 of Fig. 1
Fig. 4 is a detail perspective view of one end of the split rim section

Referring to the drawings, there is shown a vehicle wheel having the felly 1 and a felly rim 2, the latter at one edge having a rim flange 3 designed to preclude the movement of the clincher rim laterally to one side when the clincher rim is mounted on the felly rim as it is in practice. The usual rim lugs 4 secured in place by bolts 5 serve to retain the rim against lateral displacement on that side of the wheel opposite the flange 3. All of this construction so far described is the ordinary well known construction. The invention resides in the particular form of demountable rim and this particular form comprises the continuous ring section 6 formed at one edge with the clincher flange 7. Cooperating with this section 6 there is a split ring section 8 formed at one edge with a clincher flange 9. The ring section 8 adjacent clincher flange 9 is formed with a shoulder 10 and against this shoulder that edge of the ring 6 opposite the flange 7 abuts when the two sections are assembled. In attaching the two sections together, the split section 8 is telescoped within the continuous section 6 and this section 8 at its ends is formed with the flange portions 11 on the edge opposite the clincher flange 9. These flange portions 11, however, are of very short length, extending only along a very short portion of the section 7 and from the split ends thereof. There is also formed with the section 9 at a point diametrically opposite the flange portions 11 a third flange portion 12 which is substantially of a length equal to the combined length of the two flange portions 11. These flange portions 11 and 12 engage the outer edge of the ring section 6 when the two sections are attached together and the inner end of the section 6 abuts the shoulder 10.

In attaching a tire, such as the tire 14 to the improved rim, it is placed first on the section 6 with its clincher bead engaging the clincher flange 7. The split ring section 8 is then attached, being inserted in the ring section 6, that portion of the section 8 containing the flange 12 being first inserted so that this flange may hook around the outer edge of the ring 6. The ring section 8 is then compressed to bring the ends into abutting relation when the flange portions 11 may be inserted through the ring 6 to hook around the outer edge of the ring 6 underneath the clincher flange 7, when the ring 8 expands, the two ends separating. The rim is then ready to be placed on the wheel and it is preferable to so place it that the section 8 is caused to abut the flange 3 of the felly rim. The clamping lugs 4 may then be placed in position and engaging the ring 6 serve to hold the rim as a whole on the wheel. Of course, when the rim is placed over the felly rim 2, the inner section 8 cannot be compressed and this being prevented the shoulder 10 and flanges 11 and 12 serve to hold this inner ring positively connected to the outer ring 6.

The invention having been described, what is claimed as new and useful is:

A clincher rim comprising a pair of telescopically connected sections each of which is provided with a clincher flange, the outer of said sections being in the form of a continuous ring, the inner of said sections being in the form of a split ring and formed with a shoulder against which that edge of the continuous section opposite the clincher flange may abut, the inner of said sections being formed adjacent its ends and opposite the clincher flange with short flanges which engage the outer section, the said inner section being further formed with a short flange diametrically opposite the first said flanges, the inner section being compressible to permit its insertion through the outer section whereby the shoulder and the aforesaid short flanges may effect a positive interlock between the two sections.

In testimony whereof he affixes his signature.

CARL A. HARDY.